UNITED STATES PATENT OFFICE.

HENRY V. WALKER, OF BROOKLYN, NEW YORK, ASSIGNOR TO THE MAAS & WALDSTEIN COMPANY, OF NEWARK, NEW JERSEY, A CORPORATION OF NEW JERSEY.

PROCESS OF MAKING HYPOCHLOROUS ACID.

972,954.        Specification of Letters Patent.      Patented Oct. 18, 1910.

No Drawing.   Application filed January 21, 1909, Serial No. 473,498.   Renewed March 23, 1910. Serial No. 551,195.

*To all whom it may concern:*

Be it known that I, HENRY V. WALKER, a citizen of the United States, and resident of Brooklyn, Kings county, New York, have invented certain new and useful Improvements in the Process of Making Hypochlorous Acid, of which the following is a specification.

This invention relates to the production of hypochlorous acid and its novelty consists in the several successive steps of the process by which it is made.

In carrying out certain chemical operations, it was necessary to secure a reagent rich in hypochlorous acid, but free from chlorin. This was found to be a matter of difficulty. There are at present known to the art two methods of producing hypochlorous acid. The first of these consists in reacting upon mercuric oxid with chlorin to produce hypochlorous acid and mercuric oxy-chlorid. As free chlorin was always present during this reaction and as the cost of mercury is practically prohibitive, and the yield was small, this method was not seriously to be considered. The second of these methods was to treat hypochlorite of sodium or calcium in dilute solution with a mineral acid also in dilute solution and in quantity only sufficient to liberate hypochlorous acid. This invariably produced free chlorin and the resulting hypochlorous acid was small in yield and its solution was necessarily dilute. Therefore this process was rejected as unavailable.

I discovered that if there was added to a solution of a suitable hypochlorite, for instance, hypochlorite of soda, a sufficient quantity of a suitable bicarbonate, for instance, bicarbonate of soda, the latter reacted upon the hypochlorite to form sodium carbonate and hypochlorous acid in the solution free from chlorin and of practically any desired strength.

In practicing my process I first produce a suitable solution of hypochlorite of soda by Muspratt's process which consists in passing chlorin into a solution of caustic soda at a low temperature until the alkalinity of the solution is about equal to one per cent. of caustic soda. This prevents the formation of the chlorate of soda. This hypochlorite may be prepared of varying strengths. I have found that a convenient strength is one containing between 15 and 25 per cent. of the sodium hypochlorite, prepared from a caustic soda solution containing 160 to 270 gms. of NaOH per liter. There is then added to such solution either in the dry state, or mixed with water insufficient in quantity to dissolve it, or in saturated solution, a suitable quantity of bicarbonate of soda. A proper proportion to employ is about 75 parts of the dry hypochlorite of soda to about 85 parts of the dry bicarbonate of soda. The point to be observed is that the bicarbonate should be in excess to insure the complete conversion of the hypochlorite of soda into the hypochlorous acid. The result is the formation of sodium carbonate and hypochlorous acid.

The following equations will serve to indicate the process:

(1) $2NaOH + Cl_2 = NaCl + H_2O + NaOCl$
(2) $NaOCl + NaHCO_3 = Na_2CO_3 + HOCl$

The process produces hypochlorous acid on a commercial scale of greater strength, purity and stability than has been heretofore possible, even on a laboratory scale.

What I claim as new is:—

1. The process of making hypochlorous acid, which consists in subjecting an aqueous solution of hypochlorite of soda to the action of an excess of a bicarbonate of a fixed alkali.

2. The process of making a liquid rich in hypochlorous acid, which consists in adding to an aqueous solution of a hypochlorite of a fixed alkali, a bicarbonate of a fixed alkali in excess to produce the formation of a carbonate of the alkali and hypochlorous acid.

3. The process of making hypochlorous acid, which consists in subjecting hypochlorite of soda dissolved in water to the action of bicarbonate of soda in the proportion of about 75 parts by weight of actual sodium hypochlorite to 85 parts by weight of actual sodium bicarbonate.

4. The process of making hypochlorous acid, which consists in subjecting hypochlorite of soda dissolved in water to the action of bicarbonate of soda.

5. The process of making hypochlorous acid, which consists in subjecting a hypochlorite of a fixed alkali dissolved in water to the action of a soluble bicarbonate.

6. The process of making hypochlorous acid, which consists in subjecting a solution of a hypochlorite of a fixed alkali to the action of a bicarbonate of a fixed alkali.

7. The process of making hypochlorous acid which consists in subjecting an alkaline solution of a hypochlorite of a fixed alkali, not contaminated by free chlorin, to the action of a bicarbonate of a fixed alkali.

Witness my hand this 19th day of January 1909, at New York, N. Y.

HENRY V. WALKER.

Witnesses:
 WILLIAM R. BAIRD,
 ALAN C. McDONNELL.